UNITED STATES PATENT OFFICE.

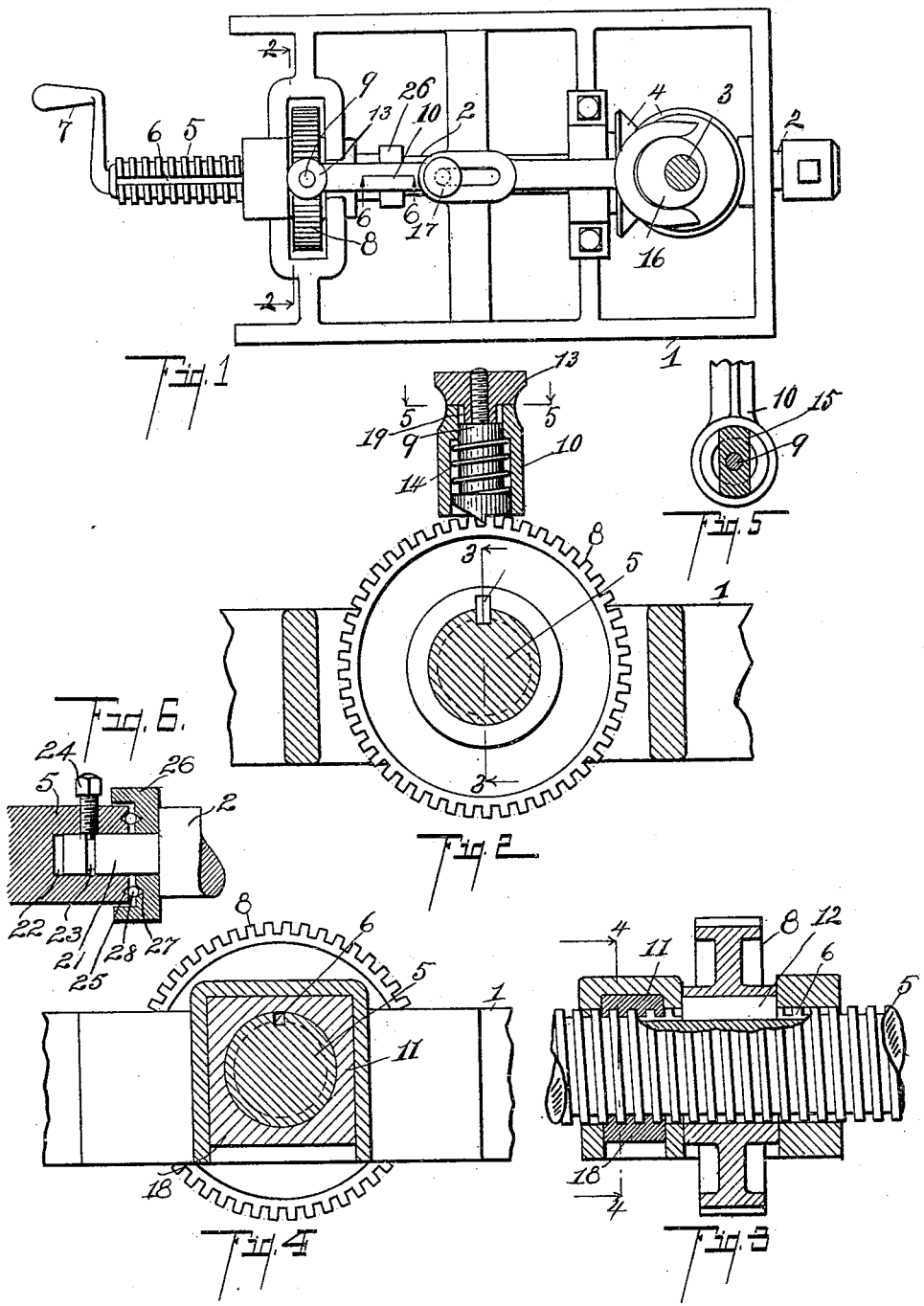

THOMAS HARGIE, OF KALAMAZOO, MICHIGAN, ASSIGNOR, BY MESNE ASSIGNMENTS, TO EUGENE COOK, OF KALAMAZOO, MICHIGAN.

DRILLING-MACHINE.

979,161.  Specification of Letters Patent.  Patented Dec. 20, 1910.

Application filed August 24, 1906. Serial No. 331,884.

*To all whom it may concern:*

Be it known that I, THOMAS HARGIE, a citizen of the United States, residing at the city of Kalamazoo, county of Kalamazoo, and State of Michigan, have invented certain new and useful Improvements in Drilling-Machines, of which the following is a specification.

This invention relates to improvements in drilling machines.

The main object of this invention is to provide in a drilling machine an improved feed mechanism for advancing the drill to or withdrawing it from the work.

Further objects, and objects relating to structural details, will definitely appear from the detailed description to follow.

I accomplish the objects of my invention by the devices and means described in the following specification.

The invention is clearly defined and pointed out in the claims.

A structure embodying the features of my invention is clearly illustrated in the accompanying drawing forming a part of this specification, in which, Figure 1 is a plan view of a structure embodying the features of my invention, the upright or standard for the driving shaft being omitted and the driving shafts being shown in section. Fig. 2 is an enlarged detail section taken on a line corresponding to line 2—2 of Fig. 1, showing details of my improved feed mechanism. Fig. 3 is a detail longitudinal section taken on a line corresponding to line 3—3 of Fig. 2. Fig. 4 is an enlarged detail taken on a line corresponding to line 4—4 of Fig. 3, showing the preferred form of arranging the feed nut for the feed screw. Fig. 5 is a detail taken on a line corresponding to line 5—5 of Fig. 2. Fig. 6 is a detail section of the swivel connection for the feed screw and tool holder taken on a line corresponding to line 6—6 of Fig. 1.

In the drawing, similar reference numerals refer to similar parts throughout the several views, and the sectional views are taken looking in the direction of the little arrows at the ends of the section lines.

Referring to the drawing, the frame 1 may be of any suitable form to properly support the operative mechanism, but is preferably formed of suitable side rails connected by cross pieces, as is illustrated in the drawings. The tool holder 2 is arranged in suitable bearings on the frame 1, the same being, in the structure illustrated, arranged in a horizontal position for use as a track drill.

The driving shaft 3 is preferably supported in a vertical position by a suitable standard which is not here illustrated. The driving shaft is connected to the tool holder by suitable beveled gears 4. A feed screw 5 is provided for the tool holder. This feed screw is provided with a longitudinal groove 6, as is clearly illustrated in the drawing. The feed screw and tool holder are connected by a suitable swivel. The tool holder 2 is provided with a reduced end 21 which projects into a hole 22 provided therefor in the end of the screw. The reduced end 21 has an annular groove 23 which is engaged by the screw 24 for holding the parts together. In the end of the screw is a grooved-like ball race 25, while in the swivel member 26 is a corresponding ball race 27 for the balls 28. Any suitable form of swivel may be used in this relation.

On the rear end of the feed screw is a crank 7 by means of which the screw may be revolved to feed the same up to or retract it from the work. In use, the feed screw is automatically fed with a step by step movement, the mechanism by which this is accomplished preferably consisting of a ratchet feed wheel 8 which is splined to the screw by means of a suitable key 12 arranged in the groove 6 in the screw. A feed lever 10 is arranged to be actuated by the cam 16 on the driving shaft 3, which engages the forward end of the lever causing the same to rock back and forth on its pivot 17.

On the rear end of the lever is a pawl adapted to engage the ratchet wheel 8 so that, as the driving shaft is revolved, the lever 10 is rocked, thereby actuating the ratchet wheel with a step by step movement to revolve the screw. The screw is provided with a fixed nut 11 so that by revolving the same it is either advanced or retracted. The nut 11 is preferably inserted in a suitable housing 18 provided therefor in the main frame. This housing is open on its under side and is of such form that, when the nut is slipped into place and the screw inserted therethrough, the nut is held in the housing and is also held by the housing against turning. This forms a simple and economical means of holding the same. Another advantage of this arrangement of parts is that in adjusting the machine to the work, the drill may be guided at the desired point by the operator with one hand while it is fed up to the work by means of the crank with the other hand, and sufficient tension applied thereto to hold the machine in proper position for beginning the drilling operation, and the necessity for blocking the machine up is thus obviated. This feature results in a very great saving of time in the manipulation of the drill.

The pawl 9 is reversible so that the feed screw may be driven in either direction by means of the driving shaft, as it is found in practice that it sometimes requires considerable power to withdraw the drill from the rail. While this can be done by means of the crank 7, it is evident that more power can be exerted by means of the driving shaft. The pawl 9 is preferably vertically arranged in a suitable socket or housing formed therefor on the rear end of the lever 10.

A spring 14 is provided for holding the pawl normally downward. The thumb piece 13 of the pawl is provided with a rib 15 on its under side adapted to fit into a suitable slot 19 provided therefor in the lever which prevents its rotation when in its engaging position, and by lifting up and turning the rib crosswise of the slot, the pawl is held out of its engaging position so that the screw can be freely revolved in either direction. This, of course, relieves the pawl of considerable wear.

In practice, the drill may be fed up to its work by means of the crank 7 bringing sufficient tension on the parts to hold the drill in position for commencing the drilling. It is evident that the drill can be as rapidly withdrawn, it only being necessary to disengage the pawl or to reverse the same. Another very great advantage of my present construction is that the ratchet wheel is relieved of all the thrust, so that the feed mechanism is very easily operated and there is comparatively little wear thereon. Should the drill be wedged or stuck in the work, it can be withdrawn therefrom by means of the driving shaft, as stated.

My improvements, as it will be evident, enable the very rapid manipulation of the drill, and I secure thereby a structure which is not only economical to produce and convenient in use, but which is very durable, as the wear and strain upon the parts is reduced to a minimum.

I have illustrated and described my improvements in detail in the form preferred by me on account of the structural simplicity and economy. I am, however, aware that they are capable of considerable variations in structural details without departing from my invention.

Having thus described my invention, what I claim as new and desire to secure by Letters Patent is:

1. In a drilling machine, the combination of a tool holder; a feed screw therefor; a swivel connection for said tool holder and feed screw; a fixed bearing nut for said feed screw, arranged to receive the thrust thereof; a feed wheel splined upon said feed screw and secured against longitudinal movement thereon; driving connections for said feed wheel and tool holder whereby the said feed wheel may be driven in either direction as desired, said driving connection being adapted to be disconnected from said feed wheel; and a crank on said screw for manipulating the same independently of said driving connections, for the purpose specified.

2. In a drilling machine, the combination of a tool holder; a feed screw therefor; a swivel connection for said tool holder and feed screw; a fixed bearing nut for said feed screw, arranged to receive the thrust thereof; a feed wheel splined upon said feed screw and secured against longitudinal movement thereon; driving connections for said feed wheel and tool holder, said driving connections being adapted to be disconnected from said feed wheel; and a crank on said screw for manipulating the same independently of said driving connections, for the purpose specified.

In witness whereof, I have hereunto set my hand and seal in the presence of two witnesses.

THOMAS HARGIE. [L. S.]

Witnesses:
OTIS A. EARL,
LULU G. GREENFIELD.